No. 830,839. PATENTED SEPT. 11, 1906.
D. E. JOHNSON.
MECHANISM FOR TRANSMITTING POWER FROM CAR AXLES.
APPLICATION FILED NOV. 17, 1905.
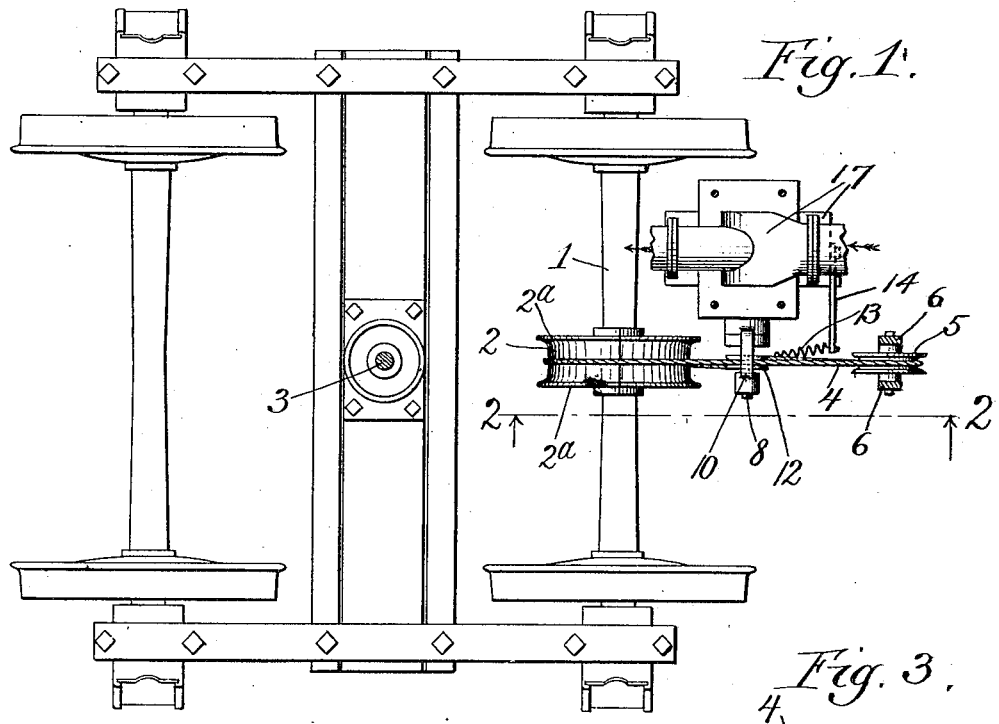
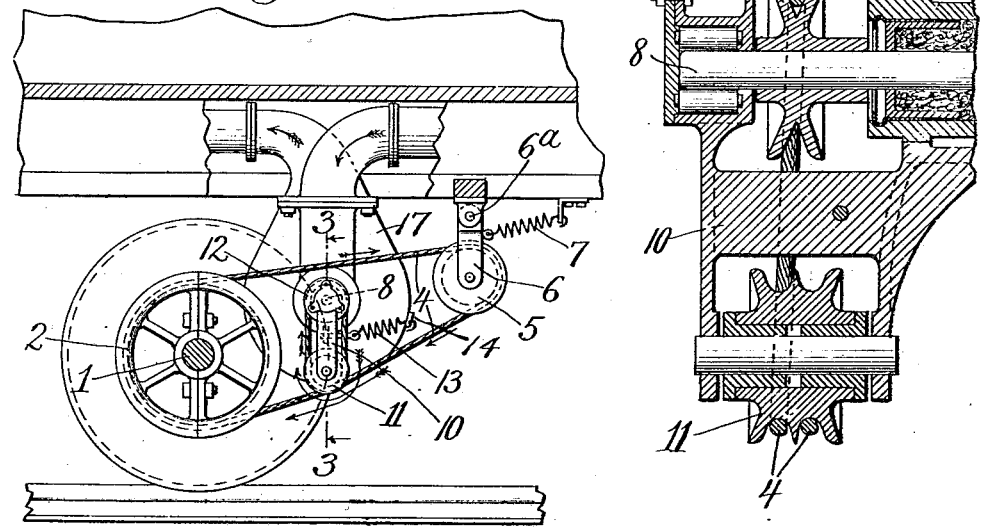
Witnesses,
Edward T. Wray.
J S Abbott
Inventor.
Delbert E Johnson
by Burton Burton
his Attys.

UNITED STATES PATENT OFFICE.

DELBERT E. JOHNSON, OF CHICAGO, ILLINOIS.

MECHANISM FOR TRANSMITTING POWER FROM CAR-AXLES.

No. 830,839.  Specification of Letters Patent.  Patented Sept. 11, 1906.

Application filed November 17, 1905. Serial No. 287,788.

*To all whom it may concern:*

Be it known that I, DELBERT E. JOHNSON, a citizen of the United States, residing at Chicago, in the county of Cook and State of Illinois, have invented new and useful Improvements in Mechanism for Transmitting Power from Car-Axles, of which the following is a specification, reference being had to the accompanying drawings, forming a part thereof.

The purpose of this invention is to provide improved devices for transmitting power from the axle of a railway-car to any mechanism mounted upon the car-body.

It consists in the devices, elements, and combinations set out in the claims.

In the drawings, Figure 1 is a plan view of a car-truck and mechanism associated therewith embodying my invention, same being shown with the car-body removed, leaving the parts which would be mounted thereon in their proper position relative to the truck. Fig. 2 is a section at the line 2 2 on Fig. 1. Fig. 3 is a section at the line 3 3 on Fig. 2.

On the wheel-axle 1 there is mounted a power-transmitting pulley 2. This pulley has lateral flanges 2ª, and between them its face is curved concavely, the curvature at the side toward the truck-pivot or king-bolt 3 being in the arc of a circle about the axis of said king-bolt. This pulley is designed to communicate power by means of a cable 4, which extends thereabout and also about an idle pulley 5, mounted in a hanger 6, which is pivoted to the car-body at 6ª, so that it can swing toward and from the car-axle, a spring 7 being connected to the hanger and to the car-body for retracting the hanger from the axle and yielding to permit it to swing toward said axle. Intermediate the car-axle and the hanger 6 there is mounted on the car-body the device to which power is to be transmitted. In the particular construction shown in the drawings this device consists of a fan for producing air circulation, and the fan-case 17 may represent, therefore, any hanger or bearing for the initial shaft of the device to which power is to be transmitted. The particular form of the fan-shaft 8 and its bearings in so far as they happen to be shown in the drawings are not essential and do not constitute any distinctive part of the invention, which may be applied to any shaft mounted on the car-body; but whatever be the form of the shaft or of the device there is pivoted about the bearing of the shaft a hanger 10, in which there is journaled a double-groove take-up pulley 11, and on the shaft 9 there is mounted a work-pulley 12, having a V-shaped groove for the cable 4, which extends from one side of the pulley 2 around the pulley 11 in one of its grooves, thence up about the work-pulley 12, thence down about the pulley 11 in the other groove, and thence around the pulley 5 on the hanger 6, and thence back to the pulley 2. A spring 13 connects the hanger 10 to any fixed element, as to the lug 14, on the fan-case or hanger, which affords bearing for the shaft 8, tending to hold the hanger 10 yieldingly away from the car-axle—that is, in the same direction in which the spring 7 tends to hold the hanger 6.

The king-bolt 3 being at fixed position with respect to the car-body, and therefore with respect to the bearing of the shaft 8 in the fan-case or shaft-hanger 3, it follows that the oscillation of the truck relatively to the car about the king-bolt will cause the side of the pulley 2 proximate to the king-bolt to move in the arc of a circle about the king-bolt, and said side being curved in such an arc will not change its distance from the king-bolt through such oscillation of the truck. The purpose of thus curving the pulley is that this distance may be preserved unchanging, as is desirable, because thereby the total spread or extent of the cable in passing around the two remote wheels of its course 2 and 5 is kept uniform; and the breadth of the concave face of the pulley 2 is designed to be sufficient to accommodate the cable through all ordinary changes of the position of the truck during its oscillation about the king-bolt.

The longitudinal movement of the car-body relatively to the truck, which occurs in the operation of the car on the track from various causes, would render it impracticable to employ a belt or cable for the driving connection between the driving-pulley on the axle and the driven pulley on the car without special provision for preventing the excessive strain upon the driving cable or belt when the longitudinal movement of the car occurs in such direction as to increase the distance between the driving and driven pulleys and for preventing the excessive slack which would interrupt the driving action when the movement occurs in such direction as to cause the two pulleys to approach each other, for since the variation in the distance between the two pulleys could only be provided for by a slack-take-up pulley operating on the belt or cable, and since such pulley could only be properly located so as to operate upon the slack ply of the belt or cable it would not be in desirable or operative position for performing its function except for one direction of travel of the car, and when the direction of travel was reversed, causing the slack to occur upon the other ply of the belt, the take-up pulley would be operating upon a taut ply and would not perform its function properly. To accomplish the purpose of taking up the slack under all conditions and for travel of the car in both directions is one specific purpose of the structure shown, in which, it will be observed, the slacking of the cable by the longitudinal movement of the car relatively to the truck causing the fixed driven wheel 12 to approach the wheel 2 will not operate to slack the cable on the wheel 12 in whichever direction the car is traveling and the wheel 2 rotating, because, considered with reference to the wheel 12, the slack ply of the belt will either be that portion running from said wheel around one of the grooves of the wheel 11 to the wheel 5 or that portion running from the other side of the wheel 12 around the other groove of the wheel 11 to the wheel 2, so that in either case the double-groove wheel 11 is operating upon the slack ply, and since the spring 13 tends to draw the hanger 10 in the direction for increasing the total amount of cable required to traverse all the pulleys, the maximum requirement being that which is made necessary by the hanger 10 moving to position at which the plane containing the axes of the pulleys 11 and 12 makes equal angles with the cable running, respectively, to and from the two grooves of the pulley 11, there is always capacity for taking up any slack which the longitudinal movement of the car relatively to the truck may cause to occur. In any movement of the car which tends to increase the distance between the pulleys both springs 7 and 13 will yield, permitting the bearings of the wheels 5 and 11 to substantially maintain their relation to the axle 1, and in any movement which tends to diminish the distance between the wheels the brackets will swing in the opposite direction to take up the slack of the cable on both upper and lower plies; but in all these changes the plies of the cable extending between the wheels 11 and 12 will remain taut and in good driving relation to the pulley 12.

The pulley 11 is essentially a take-up pulley, as above indicated, and it is not important to make special provision for positive grip of the driving-cable thereon. The grooves of this pulley are therefore deep, merely for insuring the retention of the cable in them; but they are also, as to width, such as to leave the cable free in passing about them. The cable 12, however, being a work-pulley, and a positive grip of the cable thereon being important, its groove is made V-shaped, as shown, so that the cable is drawn tightly into it whichever be the direction of movement.

I claim—

1. In a device for transmitting power from a car-axle, in combination with a driving-pulley fast thereon, a driven pulley mounted on the car-body, and a power-transmitting belt or cable from the driving to the driven pulley, the car-axle pulley having its face concave toward the vertical axis of the car-truck, the radius of its curvature being substantially the distance from said axis to said face.

2. In a device for transmitting power from a car-axle, in combination with a driving-pulley on the axle, a work-wheel mounted in fixed bearings on the car; an idle wheel and yielding bearings for the same mounted on the car at the opposite side of the work-wheel from the axle-pulley; a hanger pivoted about the bearings of the work-wheel; a take-up pulley mounted in said hanger, and a driving belt or cable which encompasses the axle-pulley and the idle pulley and intermediately is looped to encompass the work-pulley and the take-up pulley.

3. In a mechanism for transmitting power from a car-axle, in combination with a driving-pulley on the axle, an idle pulley and yielding bearings for the same mounted on the car; a spring which tends to retract the idle pulley from the axle-pulley; a work-pulley mounted in fixed bearings on the car intermediate the axle-pulley and the idle pulley; a take-up pulley and bearings for the same mounted for movement yieldingly substantially longitudinally with respect to the car, and a driving-cable encompassing the axle-pulley and the first-mentioned yielding pulley and intermediately looped to encompass the work-pulley and the take-up pulley.

4. In a mechanism for transmitting power from a car-axle, in combination with a driving-pulley on the axle, an idle pulley and a hanger in which same is carried mounted on the car for movement yieldingly toward and from the car-axle; a work-pulley and fixed bearings for same on the car; a take-up pulley and bearings for the same supported on the car with capacity for movement toward and from the car-axle; springs tending to retract it from the car-axle, and a driving-cable encompassing the axle-pulley and the idle pulley and intermediately looped to encompass the work-pulley and the take-up pulley.

In testimony whereof I have hereunto set my hand, in the presence of two witnesses, at Chicago, Illinois, this 15th day of November, 1905.

DELBERT E. JOHNSON.

Witnesses:
CHAS. S. BURTON,
M. GERTRUDE ADY.